United States Patent [19]

Burgin

[11] Patent Number: 4,515,996
[45] Date of Patent: May 7, 1985

[54] TELEPHONE CIRCUIT

[75] Inventor: Kenneth N. Burgin, Swindon, England

[73] Assignee: U.S. Philips Corporation, New York, N.Y.

[21] Appl. No.: 513,941

[22] Filed: Jul. 15, 1983

[30] Foreign Application Priority Data

Aug. 25, 1982 [GB] United Kingdom ............... 8224346

[51] Int. Cl.³ ............................................. H04M 1/76
[52] U.S. Cl. ............................. 179/81 B; 179/100 L; 179/16 F
[58] Field of Search ................. 179/81 B, 81 R, 81 A, 179/16 F, 18 FA, 16 AA, 16 A, 16 C, 170 NC, 170 T, 170 D, 170 J; 365/228, 229; 364/707

[56] References Cited

U.S. PATENT DOCUMENTS 3,745,261  7/1973  Friedman ...................... 179/81 B X Primary Examiner—Gene Z. Rubinson
Assistant Examiner—James L. Dwyer
Attorney, Agent, or Firm—Thomas A. Briody; William J. Streeter

[57] ABSTRACT

Figure 1:
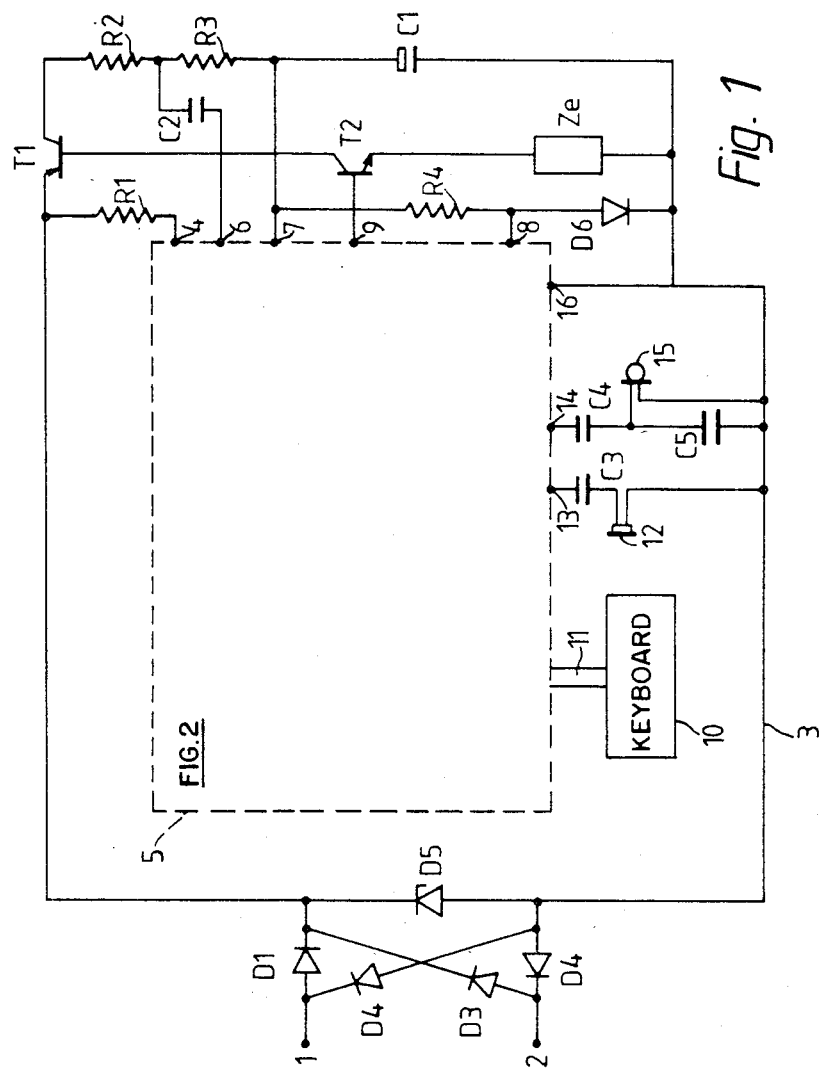
Figure 2:
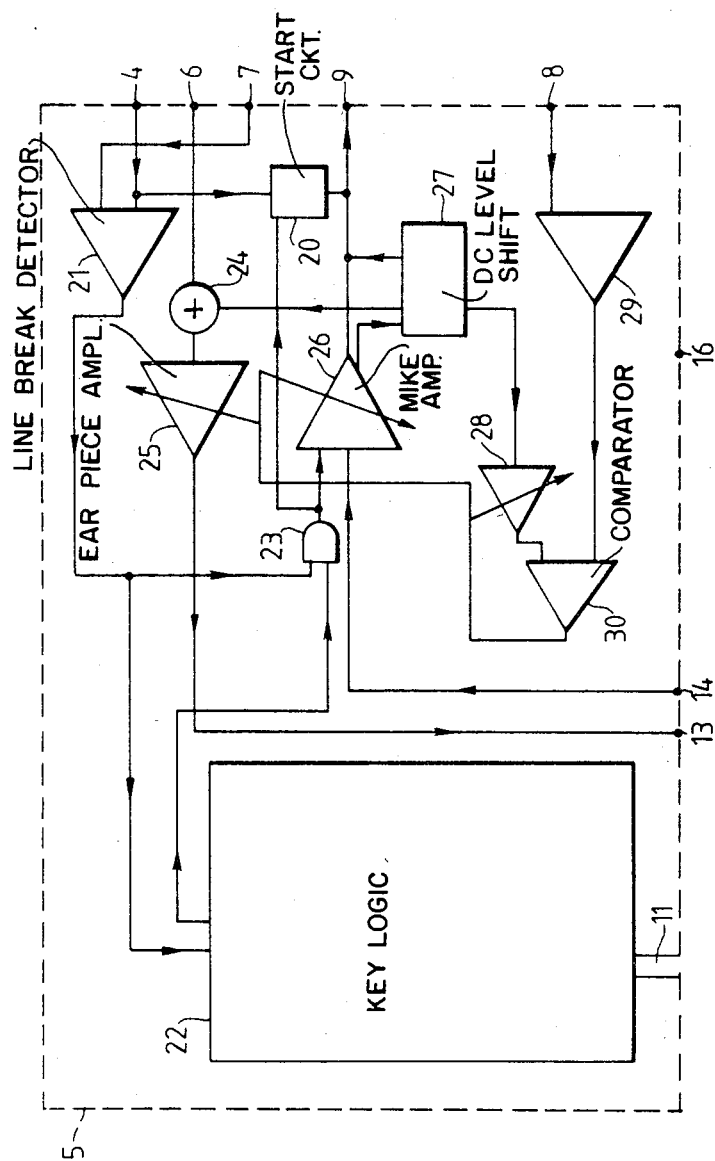

A telephone speech circuit includes an integrated circuit (5) powered by the exchange battery via the subscriber's line. The speech circuit includes an earpiece amplifier (25) and a microphone amplifier (26) whose gains are controlled as a function of the length of the subscriber's line. The voltage on pin 7 which is dependent on the line current and hence the line length is compared with a reference voltage on pin 8 which is derived from the forward voltage drop of a diode connected to pin 8 (FIG. 1). A voltage representative of that on pin 7 is derived from a d.c. level shift circuit (27) and applied to the input of an amplifier (28). The reference voltage on pin 8 is applied to the input of an amplifier (29). The outputs of the amplifiers (28) and (29) are compared in a comparator (30) whose output is coupled to gain control inputs of the amplifier (28), the microphone amplifier (26) and the earpiece amplifier (25). FIG. 2.

6 Claims, 3 Drawing Figures

TELEPHONE CIRCUIT

The invention relates to a telephone speech circuit including an integrated circuit powered by the exchange battery via the subscriber's line, the speech circuit including a microphone amplifier and an earpiece amplifier.

In a telephone system the amplitude of the speech signal received via the subscriber's line may vary depending on the length of the subscriber's line, long lines having a greater attenuation than short lines. Thus a subscriber situated a long distance from the exchange may have difficulty hearing the subscriber to whom he is connected and vice versa. This problem may be overcome by providing such a subscriber with amplifiers to amplify the received signal and the signal to be transmitted. However this will be a non-standard instrument as such amplification would be undesirable when the instrument is connected to a short line. This disadvantage could be overcome by providing a manual volume control but such devices increase the cost.

It is an object of the invention to provide a common telephone speech circuit which minimises the differences in speech levels between long and short lines.

The invention provides a telephone speech circuit as described in the opening paragraph characterised in that the gains of the microphone and earpiece amplifiers are controlled in accordance with the length of the subscriber's line to which the circuit is connected by an automatic gain control circuit which comprises means for generating a reference voltage, means for comparing the reference voltage with the voltage across the power supply terminals of the integrated circuit and producing a control signal dependent on the difference between these voltages, and means for applying the control signal to control inputs of the microphone and earpiece amplifiers to control the gains thereof such that the gains increase as the length of the subscriber's line increases. The reference voltage maybe derived from the forward voltage drop across a semiconductor diode.

By sensing a voltage derived from the line current, which is dependent on the line length, and using this voltage to vary the gain of the microphone and earpiece amplifiers the volume of the received speech signal may be maintained relatively constant and the amplitude of the transmitted signal may be matched to the length of the subscriber's line.

The invention further provides a telephone speech and signalling circuit in which the power supply for the integrated circuit is maintained during line breaks by the charge on a capacitor which is charged from the exchange battery via the collector-emitter path of a transistor when the subscriber's line is looped, means being provided to prevent the discharge of said capacitor through the transistor when a line break is detected, said means being operative to reduce the conductivity of the transistor to such a value that no significant current passes through it from said capacitor by applying an appropriate signal to its control electrode.

The means for preventing the discharge of the capacitor may comprise a comparator for comparing the voltage on the subscriber's line with that across the capacitor and producing an output signal which is coupled to the control electrode of the transistor to reduce the conductivity of the transistor when the voltage on the subscriber's line is less than that across the capacitor.

This arrangement preserves the charge on the capacitor enabling it to be used to mainain the essential functions of the signalling circuit during short line breaks.

The circuit may include a sidetone cancellation arrangement which comprises a summing circuit, means for feeding the output of the microphone amplifier to a first input of the summing circuit, means for feeding the output of the microphone amplifier through the first and further transistors to a second input of the summing circuit, the last mentioned means producing a phase inverted signal, and means for feeding the output of the summing circuit to the input of the earpiece amplifier.

The further transistor may be provided with an emitter load which is selected to give a maximum level of side tone cancellation when the circuit is connected to a line having characteristics substantially mid-way between those of a minimum and a maximum length subscriber's line.

Figure 3:
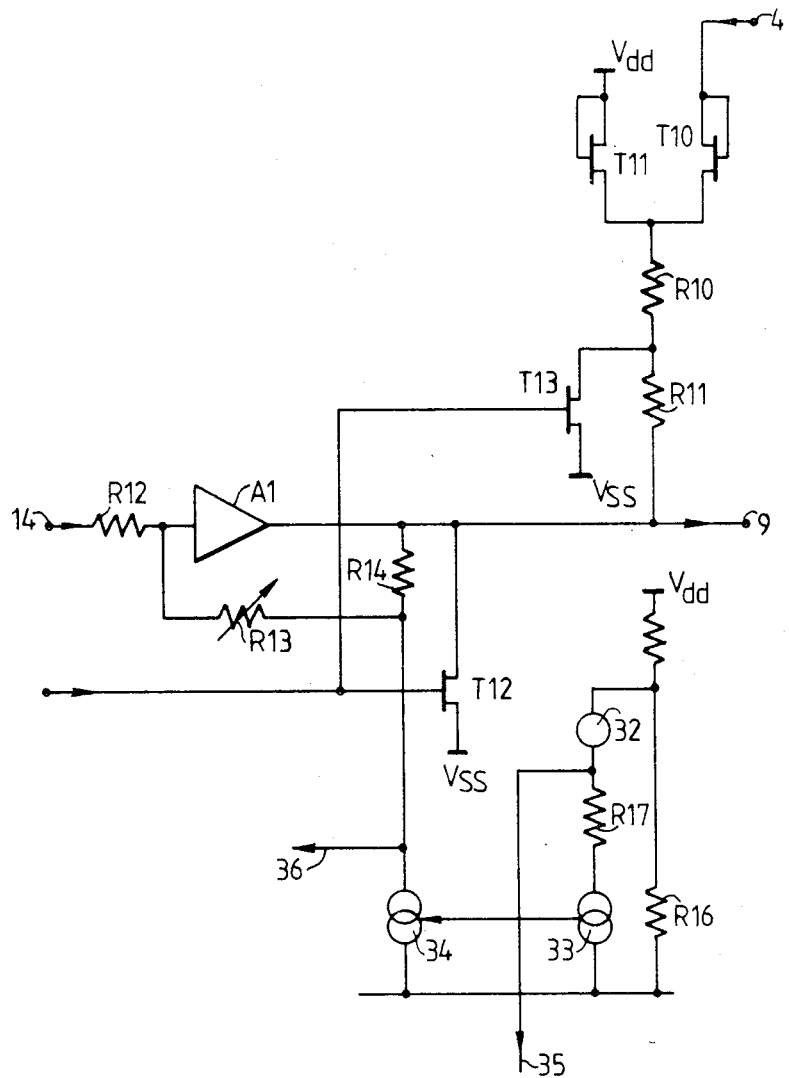

An embodiment of the invention will now be described, by way of example, with reference to the accompanying drawings, in which:

FIG. 1 shows a telephone speech and signalling circuit according to the invention, FIG. 2 is a block schematic diagram of the integrated circuit shown in FIG. 1, and FIG. 3 is a circuit diagram of a portion of the integrated circuit shown in FIG. 2.

The speech and signalling circuit for a telephone instrument shown in FIG. 1 is arranged to be connected to a subscriber's line via two terminals 1 and 2 and includes a bridge rectifier comprising four diodes D1 to D4 to enable the circuit to be connected to lines of either polarity. A zener diode D5 is connected across the line to protect the circuit against high transient voltages wich may be induced in the subscriber's line. The terminal 1 is connected via the diode D1 to the junction of a resistor R1 and the emitter of a pnp transistor T1. The collector of transistor T1 is connected to one end of a resistor R2 which forms part of a series arrangement which also comprises a resistor R3 and a capacitor C1, the other end of the series arrangement being connected via a line 3 and the diode D2 to the terminal 2. The other end of the resistor R1 is connected to a terminal 4 of an integrated circuit 5 which together with the peripheral components shown in FIG. 1 forms a speech and signalling circuit for a telephone instrument. A terminal 6 of the integrated circuit 5 is connected to the junction of resistors R2 and R3 via a capacitor C2, while a terminal 7 is connected to the junction of the resistor R3 and the capacitor C1 and to one end of a resistor R4, the other end of which is connected via a diode D6 to the line 3 and to a terminal 8 of the integrated circuit 5. The base of transistor T1 is connected to the collector of an npn transistor T2 whose base is connected to a terminal 9 of the integrated circuit 5 and whose emitter is connected to one end of a load impedance Ze the other end of which is connected to the line 3.

A keyboard 10 is connected to the integrated circuit 5 via a highway 11 to enable a subscriber to key the number of the subscriber to whom he wishes to be connected. The series arrangement of an earpiece 12 and a capacitor C3 is connected between the line 3 and terminal 13 of the integrated circuit 5. The series arrangement of two capacitors C4 and C5 is connected between the line 3 and a terminal 14 of the integrated circuit 5, a microphone 15 being connected between the junction of the capacitors C4 and C5 and the line 3. The line 3 is also connected to a terminal 16 of the integrated circuit 5.

FIG. 2 is a block schematic diagram of the integrated circuit 5. The terminal 4 is connected to a first input of a start up circuit 20 and to a first input of a line break detector 21. A second input of the line break detector 21 is connected to the terminal 7 while its output is connected to a first input of a logic circuit 22 and the first input of an OR gate 23. The terminal 6 is connected to a first input of a summing circuit 24 whose output is connected to the input of an earpiece amplifier 25, the output of which is connected to the terminal 13. The terminal 14 is connected to the input of a microphone amplifier 26 a first output of which is connected to the terminal 9 and a second output of which is connected to a second input of the summing circuit 24 via a d.c. level shift circuit 27. A further output of the d.c. level shift circuit 27 is connected to terminal 9 while a third output thereof is fed to the input of an amplifier 28. The terminal 8 is connected to the input of an amplifier 29. The outputs of the amplifiers 28 and 29 are fed to first and second inputs of a comparator 30 whose output is connected to the earpiece amplifier 25, the microphone amplifier 26, and the amplifier 28 to control their gains. An output of the logic circuit 22 is fed to the second input of the OR gate 23 while the highway 11 is connected to further inputs of the logic circuit 22.

The principle of operation of the speech and signalling circuit shown in the accompanying drawings is as follows.

Transistor T1 is simply a switch which is in the saturated state during speech and dial make periods, switching off only during impulses and line breaks. Transistor T2 provides amplification during speech and dial make periods but switches off during impulses and line breaks. Most of the line current flows down the base of transistor T1 and through transistor T2. The current supplying the integrated circuit flows through resistors R2 and R3 which together determine the telephone impedance since transistor T2 looks like a current source with a high impedance. Capacitor C1 smoothes the Vdd rail and keeps the circuit running during impulses and line breaks. Resistor R1 provides a small current which is used to start up the circuit by providing a small base current for transistor T2 and hence transistor T1. Resistor R4 and diode D6 provide a voltage reference and the diode D5 is a 150 volt Zener diode for protection against transient voltages induced in the subscriber's line.

The signal from the microphone 15 is amplified by the microphone amplifier 26 and is applied to the base of transistor T1. The output of the microphone amplifier also provides a feedback signal via transistors T1 and T2, resistors R2 and R3 and capacitor C2 and a sidetone cancellation signal via the d.c. level shift circuit 27.

The signal from the line is obtained via an attenuator comprising resistors R2 and R3 and is fed to the earpiece amplifier 25 after being summed with the sidetone signal from the microphone amplifier 26 in the summing circuit 24 to provide sidetone cancellation.

Both the microphone and earpiece amplifiers 26 and 25 have a line dependent gain which is controlled by an A.G.C. circuit. This circuit takes a voltage dependent on the voltage Vdd at terminal 7 and compares it with a voltage from the voltage reference circuit comprising the resistor R4 and the diode D6. By this means the amplifier gains are adjusted as a function of line current.

When the hook switch is operated the exchange battery is connected to the circuit via the terminals 1 and 2 and current starts to flow through the resistor R1 causing the start up circuit 20 to supply current via the terminal 9 to the base of transistor T2. This causes the transistor T1 to become conductive and hence connect the series arrangement of resistors R2 and R3 and capacitor C1 across the subscriber's line and thus capacitor C1 becomes charged. The power source for the circuit is the exchange battery via the subscriber's line and the capacitor C1 smooths this supply and the charge on the capacitor C1 which is connected between terminals 7 and 16 of the integrated circuit 5 provides the power source for the circuit 5 during line breaks caused by switching actions in the exchange and loop disconnect pulses generated by the logic circuit 22.

The logic circuit 22 detects key depressions on the keypad 10, stores them, and converts them into appropriate line disconnect pulses which are applied to the second input of the OR gate 23. Such circuits are well known in the art, an example being that described in UK Pat. No. 1195141. When a disconnect pulse is generated the current drive to the base of transistor T2 is reduced to cause transistor T2 to switch off which consequently causes transistor T1 to switch off, the supply for the integrated circuit 5 being maintained by the charge on the capacitor C1.

In the speech mode the signal from the microphone 15 is fed to the input of amplifier 26 and then to the line via the transistor T2 which further amplifies the speech signal.

The transistor T2 together with its emitter impedance Ze forms an amplifier having a gain approximately equal to $$\frac{(R2 + R3) Zo}{(R2 + R3 + Zo)Ze} \text{ where } Zo \text{ is the impedance}$$

of the subscriber's line. The amplifier formed by transistor T2 will also invert the phase of speech signal. The speech output fed to the line via the transistor T1 is also fed back via resistor R2 and capacitor C2 to the input 6 of the integrated circuit 5 and from there to the first input of the summing circuit 24. The output of the microphone amplifier 26 is fed via the d.c. level shift circuit 27 to the second input of the summing circuit 24. Since there is a 180° phase shift in the transistor T2 the signals at the inputs to the summing circuit are in antiphase and thus subtract from each other giving a reduced level input to the earpiece amplifier 25. The level of sidetone generated will depend on the line impedance and hence the line length and on the value of the impedance Ze in the emitter circuit of transistor T2. The impedance Ze is selected to give minimum sidetone when the circuit is connected to a medium length line, the sidetone increasing on short or long lines. The impedance Ze may comprise, for example, a resistor in parallel with the series arrangement of a capacitor and a further resistor. Audio signals received via the subscriber's line pass through the transistor T1 and are fed via the resistor R2 and capacitor C2 to the terminal 6 of the integrated circuit 5 and then through the summing circuit 24 to the input of the earpiece amplifier 25. Since these signals do not pass through the microphone amplifier 26 there is no corresponding signal applied to the other input of the summing circuit 24 and hence no attenuation of the received signal before application to the earpiece amplifier 25. Since the signals of both the microphone and earpiece amplifiers pass through transistor T1 this transistor is common to both paths giving rise to the need for sidetone cancellation.

The gains of the microphone amplifier 26 and the earpiece amplifier 25 are automatically controlled to compensate for the length of the subscriber's line to which the circuit is connected. The automatic gain control circuit operates as follows. A constant reference voltage is generated by means of the current passed through the diode D6 via the resistor R4 and this reference voltage is applied to terminal 8 of the integrated circuit 5. The reference voltage is fed via a buffer amplifier 29 which may include a voltage multiplier to a first input of a comparator 30. A further voltage which is proportional to the supply voltage Vdd applied to terminal 7 of the integrated circuit 5 and consequently to the length of the subscriber's line is generated in the d.c. level shift circuit 27 and applied to the input of the amplifier 28. The comparator 30 produces an output dependent on the outputs of the amplifiers 28 and 29, the output of the comparator 30 being fed to a control input of the amplifier 28 to modify its gain such that the two inputs to the comparator tend towards equality. The gain control signal produced by the comparator 30 is also fed to a control inputs of the microphone and earpiece amplifiers 26 and 25 and consequently adjusts their gains in accordance with the length of the subscriber's line. Thus on long lines a higher level signal is fed from the microphone amplifier to the line and the earpiece amplifier has an increased gain to compensate for the lower level signal received.

During signalling the circuit may be subject to line breaks caused by the exchange and these should not interfere with the signalling. Consequently it is necessary that the circuit should be able to recognise these line breaks and to conserve the power stored on the capacitor C1 until the power from the exchange returns. To achieve this function the line break detector 21 compares the voltage on the line with that stored on the capacitor C1. The voltage on the line is detected by detecting the voltage on terminal 4, the voltage drop across resistor R1 being minimal after the start up circuit 20 has operated. When the voltage on the line falls below that on the capacitor C1 the line break detector 21 produces an output which is fed via the OR gate 23 to inhibit the microphone amplifier 26 and reduce the drive to transistor T2. Consequently the current through transistor T1 is reduced to a level which is sufficient to allow the line voltage to be discharged but not to allow any significant discharge of the capacitor C1. The current passed by transistor T2 is of the order of a few μA. If transistor TR1 is completely cut-off then the voltage across capacitor C1 will fall due to the current taken by the integrated circuit and thus cause the line break detector to assume that the line has been re-made and again switch on transistor TR1 for a short time until the line voltage, which will be discharged through transistors T1 and T2 again falls below that on capacitor C1. Thus the line voltage will be discharged only to the level of the voltage across capacitor C1. At the same time a signal is fed to the logic circuit 22 to start a timer which times the length of the line break and if the line break exceeds a preset limit the timer causes the circuit to be reset to speech mode on the assumption that the break is caused by a hook switch break action. If the line break duration is less than the preset limit impulsing is resumed on the return of power from the exchange. Thus it is desirable to steadily discharge the line voltage so that the line break detector only operates once at the beginning of each line break period.

FIG. 3 shows an embodiment of the microphone amplifier 26, d.c. level shift circuit 27, and start up circuit 20 in greater detail. The terminal 4 of the integrated circuit 5 is connected to the gate and source electrodes of a field effect transistor (FET) T10 whose drain electrode is connected to one end of the series arrangement of two resistors R10 and R11, the other end of the series arrangement being connected to terminal 9 of the integrated circuit 5. A second FET T11 has its gate and source electrodes connected to the positive supply rail Vdd (terminal 7) and its drain electrode connected to the junction of resistor R10 and the drain electrode of FET T10. The field effect transistors T10 and T11 are constructed so that the gain of FET T11 is very much greater than that of the FET T10. Thus the start up circuit 20 operates as follows. When the hook switch is made current flows from the exchange battery along the subscriber's line and through resistor R1, terminal 4, FET T10, resistors R10 and R11, and terminal 9 to the base of transistor T2. This current turns on transistor T2 which provides a base current to transistor T1 thus enabling current to flow through transistor T1 and resistors R2 and R3 to terminal 7 and to charge the capacitor C1. As the voltage on terminal 7 increases current flows through FET T11 and resistors R10 and R11 to the base of transistor T1 to maintain it in a conductive state. Since the gain of FET T11 is very much greater than that of FET T10 very little current flows through FET T10 and consequently through resistor R1. Thus once the start up circuit 20 has performed its initial function the current through resistor R1 is reduced to such a small value that the voltage drop across it is negligible. Thus the voltage on terminal 4 of the integrated circuit 5 can be used by the line break detector 21 to monitor the line voltage.

The microphone amplifier 26 comprises an amplifier A1 whose input is connected to terminal 14 of the integrated circuit 5 via a resistor R12, the series arrangement of two further resistors R13 and R14 being connected between the input and output of the amplifier A1. Resistor R13 is variable and determines the gain of the microphone amplifier 26. In practice the resistor R13 is in the form of a transistor whose conductivity is controlled by the output signal from the comparator 30. A second input 31 of the amplifier 26 is connected to the gate of an FET T12 whose source is connected to terminal 9 of the integrated circuit 5 and whose drain is connected to the negative supply potential Vss (terminal 16). The input 31 of the amplifier 26 is connected to the output of the OR gate 26 which is also connected to the gate electrode of an FET T13 in the start up circuit 20. The source electrode of FET T13 is connected to the junction of resistors R10 and R11 while its drain electrode is connected to the negative supply potential Vss.

The d.c. level shift circuit 27 includes a potential divider circuit connected between the positive and negative supply potentials Vdd and Vss, the potential divider comprising two resistors R15 and R16. The series arrangement of a voltage source 32, a resistor R17 and a current source 33 is connected between the junction of resistors R15 and R16 and the negative supply potential Vss. A further current source 34 is connected between the negative supply potential Vss and the junction of resistors R13 and R14 in the microphone amplifier 26. The current sources 33 and 34 are coupled together to provide equal currents and may be formed as a current mirror circuit. The junction of the voltage source 32 and the resistor R17 is connected to a line 35 which is coupled to the input of the amplifier 28. Since the positive supply voltage Vdd is dependent on the length of the line the voltage on line 35 will also be dependent on the length of the line and is used as a measure of the line length to set the gains of the microphone and earpiece amplifiers 26 and 25 by means of an automatic gain control circuit which comprises the voltage reference source formed by the resistor R4 and diode D6, amplifiers 28 and 29 and comparator 30. The junction of resistor R14 and the current source 34 is connected via a line 36 to the second input of the summing circuit 24. The d.c. level shift on the output of the amplifier 26 attached to pin 9 is not reflected on the line 36 so that no d.c. level shift occurs at the input of the summing circuit 24 as a result of differing line lengths. The d.c. potential on terminal 9 will vary with line current and hence line length as a result of the voltage drop across the emitter impedance Ze of transistor T2.

When a line break is detected the signal from the output of the OR gate 23 causes the FET T12 to become more conductive and thus pull the potential on terminal 9 towards the negative supply potential Vss. At the same time current is prevented from flowing through the start up circuit 20 by turning on FET T13 and consequently connecting the junction of resistors R10 and R11 to the negative supply potential Vss. Thus the current flowing through transistor T2 and hence transistor T1 is reduced which in turn reduces the rate of discharge of the capacitor C1 through these two transistors during line breaks. It should be noted that the output of the line break detector 21 is an analogue voltage and that the signal on the gate of FET T12 does not switch this device hard 'on'. Consequently some current is still allowed to flow to the base of transistor T2 to allow the line voltage to be discharged but this current is reduced to a very low value, of the order of a few micro ampères, that no significant discharge of capacitor C1 through transistors T1 and T2 occurs.

It would, alternatively, be possible to arrange for transistor T1 to be switched hard off when a line break is detected and to provide an alternative discharge path for the line voltage. For example a transistor switch could be connected across the line the switch being operated for a short predetermined period at the start of any line break. This could be achieved by driving the transistor from a monostable circuit triggered by the output of the line break detector.

What is claimed is:

1. In telephone apparatus having an exchange battery, at least one subscriber telephone set having an integrated circuit and a subscriber line connecting said subscriber telephone set to said exchange battery so that said integrated circuit is powered thereby, whereby the energizing voltage for said integrated circuit varies in accordance with the length of said subscriber line, an improved subscriber telephone set comprising:

an earpiece amplifier and a microphone amplifier forming part of said integrated circuit, each of said amplifiers having an adjustable gain; and automatic gain control means for controlling said adjustable gains of said microphone and earpiece amplifiers in accordance with said length of said subscriber's line, said automatic gain control means comprising means for generating a reference voltage, means for comparing said reference voltage to said energizing voltage and generating a control signal dependent on the difference therebetween, and means for applying said control signal to said microphone and earpiece amplifiers to control the gains thereof so that said gains increase with increases of said length of said subscriber's line.

2. Apparatus as claimed in claim 1, wherein said reference voltage generating means comprises a semiconductor diode.

3. Apparatus as claimed in claim 2, further comprising DC level shift means generating a voltage proportional to said energizing voltage, additional adjustable gain amplifier means interconnected between said DC level shift means and said comparing means, and means for applying said control signal to said additional adjustable gain amplifier means to vary the gain thereof.

4. Apparatus as claimed in claim 3, further comprising a first transistor having an emitter-collector circuit connected in said subscriber line and a base, a further transistor having an emitter-collector circuit connected to said base and a base connected to said microphone amplifier for receiving the output therefrom, said first and further transistor constituting means for creating a phase inverted microphone amplifier output signal, said apparatus further comprising sidetone cancellation means, said sidetone cancellation means comprising a summing circuit, means for feeding said phase inverted microphone output signal and said microphone amplifier output signal to a first and second input of said summing circuit, respectively, and means for connecting the output of said summing circuit to the input of said earpiece amplifier.

5. Apparatus as claimed in claim 4, further comprising an emitter load for said further transistor, said emitter load being selected to give a maximum level of sidetone cancellation when said subscriber line has characteristics corresponding to characteristics of a line having a length substantially mid-way between a minimum and a maximum subscriber line length.

6. Apparatus as claimed in claim 4, further comprising a capacitor connected to said emitter-collector circuit of said first transistor, whereby said capacitor is charged from said exchange battery while said subscriber line is hooked, and means for preventing discharge of said capacitor thereby maintaining said energizing voltage for said integrated circuit during line breaks, said maintaining means comprising means for substantially decreasing the conductivity of said first transistor.

* * * * *